(12) United States Patent
Park et al.

(10) Patent No.: US 7,139,927 B2
(45) Date of Patent: Nov. 21, 2006

(54) JOURNALING AND RECOVERY METHOD OF SHARED DISK FILE SYSTEM

(75) Inventors: Choon Seo Park, Daejeon (KR); Gyoung Bae Kim, Daejeon (KR); Bum Joo Shin, Daejeon (KR); Yong-Ju Lee, Iksan-si (KR); Seon-Yeong Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 746 days.

(21) Appl. No.: 10/244,521

(22) Filed: Sep. 17, 2002

(65) Prior Publication Data

US 2004/0078658 A1  Apr. 22, 2004

(30) Foreign Application Priority Data

Mar. 21, 2002  (KR)  ............................. 2002-15322

(51) Int. Cl.
*G06F 11/00* (2006.01)
(52) U.S. Cl. .............................. 714/4; 714/10; 714/11; 714/12
(58) Field of Classification Search ................. 714/15, 714/18, 19, 20
See application file for complete search history.

(56) References Cited

U.S. PATENT DOCUMENTS 5,845,292 A * 12/1998 Bohannon et al. .......... 707/202
5,974,426 A   10/1999 Lee et al.
6,154,847 A * 11/2000 Schofield et al. .............. 714/4
6,874,104 B1 *  3/2005 Josten et al. ................. 714/15

OTHER PUBLICATIONS

Stephen C. Tweedie, "Journaling the Linux ext2fs Filesystem", LinuxExpo '98 pp. 1-8.
Kenneth W. Preslan, et al., "Scalability and Failure Recovery in a Linux Cluster File System", USENIX Association, Proceedings of the 4th annual Linux Showcase & Conference, Atlanta, Georgia, USA, Oct. 10-14, 2000.

* cited by examiner

*Primary Examiner*—Scott Baderman
*Assistant Examiner*—Timothy M. Bonura
(74) *Attorney, Agent, or Firm*—Mayer, Brown, Rowe & Maw LLP

(57) ABSTRACT

A journaling method is provided for supporting a recovery when a system is abnormally terminated in a shared disk environment. When a system call operation to take part in a journaling is generated, in order to guarantee a recovery, a transaction is started and new transaction region is assigned. Then, a system is initialized and a transaction type is set up. Lock information on modified data is acquired and added to the transaction so that a transaction manages lock information. A reflection to a disk during a modification of metadata is prevented. Modified metadata added to the transaction and modified information on principal general data are recorded. Then, lock information connected to the transaction is released.

4 Claims, 6 Drawing Sheets

JOURNALING AND RECOVERY METHOD OF SHARED DISK FILE SYSTEM

FIELD OF THE INVENTION

The present invention relates to a journaling and recovery method of a shared disk file system; and, more particularly, to a journaling and recovery method for maintaining a file system in a consistent state when the file system is abnormally terminated in a shared disk environment such as a storage area network (SAN).

BACKGROUND OF THE INVENTION

The journaling method is suggested in order to support a recovery when an abnormal termination takes place in the shared disk file system environment such as the SAN, wherein a transaction in the shared disk file system is defined as a series of operations for performing an operation on each file and is used as a fundamental unit of a recovery and an operation.

Since metadata is written to a disk and then is accessed by another host in a journaling recovery method of a conventional shared disk file system environment when another host accesses to the modified metadata, a disk access number (input/output number) is increased and a journaling speed is decreased.

Further, a recovery only on the metadata may be supported while a recovery on the real principal data may not be supported.

SUMMARY OF THE INVENTION

It is, therefore, an object of the present invention to provide a method for performing a journaling on both metadata and general principal data and a recovery method thereof, wherein, if a host modifies metadata and another host intends to access to the same metadata in a shared disk environment such as the SAN environment, the modified metadata are transmitted through a network, not being reflected to a disk, to increase a journaling speed.

In accordance with a preferred embodiment of the present invention, there is provided a journaling method for supporting a recovery when a system in a shared disk environment is abnormally terminated, comprising the steps of:

(a) starting, if a system call operation to process a journaling is generated, a transaction to guarantee a recovery so that a new transaction region is assigned and initialized and a transaction type is set up;

(b) acquiring lock information on modified data and adding the lock information to the transaction so that a transaction is allowed to manage the lock information and to prevent the log information from being written to a disk during modifying metadata; and (c) recording the modified metadata added to the transaction and modified information modified on principal general data on a journal space and releasing the lock information connected to the transaction.

In accordance with another preferred embodiment of the present invention, there is provided a recovery method of a shared disk file system for maintaining consistency of the shared disk file system by using a journaling method in a shared disk environment when a system is abnormally terminated, comprising the steps of:

(a) reading log head information;

(b) determining whether the system is normally terminated and detecting a committed entry from log information if the system is abnormally terminated;

(c) determining whether the committed entry is the end of a journal;

(d) reading disk information and journal space information in a disk and a journal space if the entry is not the end of the journal, respectively;

(e) comparing the disk information and version numbers of the journal space information; and (f) recording log information recorded in log on the disk if the version number of log information in the disk is smaller than that in the journal.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

There may exist a plurality of preferred embodiments in accordance with the present invention, but a preferred embodiment will be described in detail with reference to the accompanying drawings. The object, features and advantages of the present invention will be more apparent through the preferred embodiment.

Figure 1:
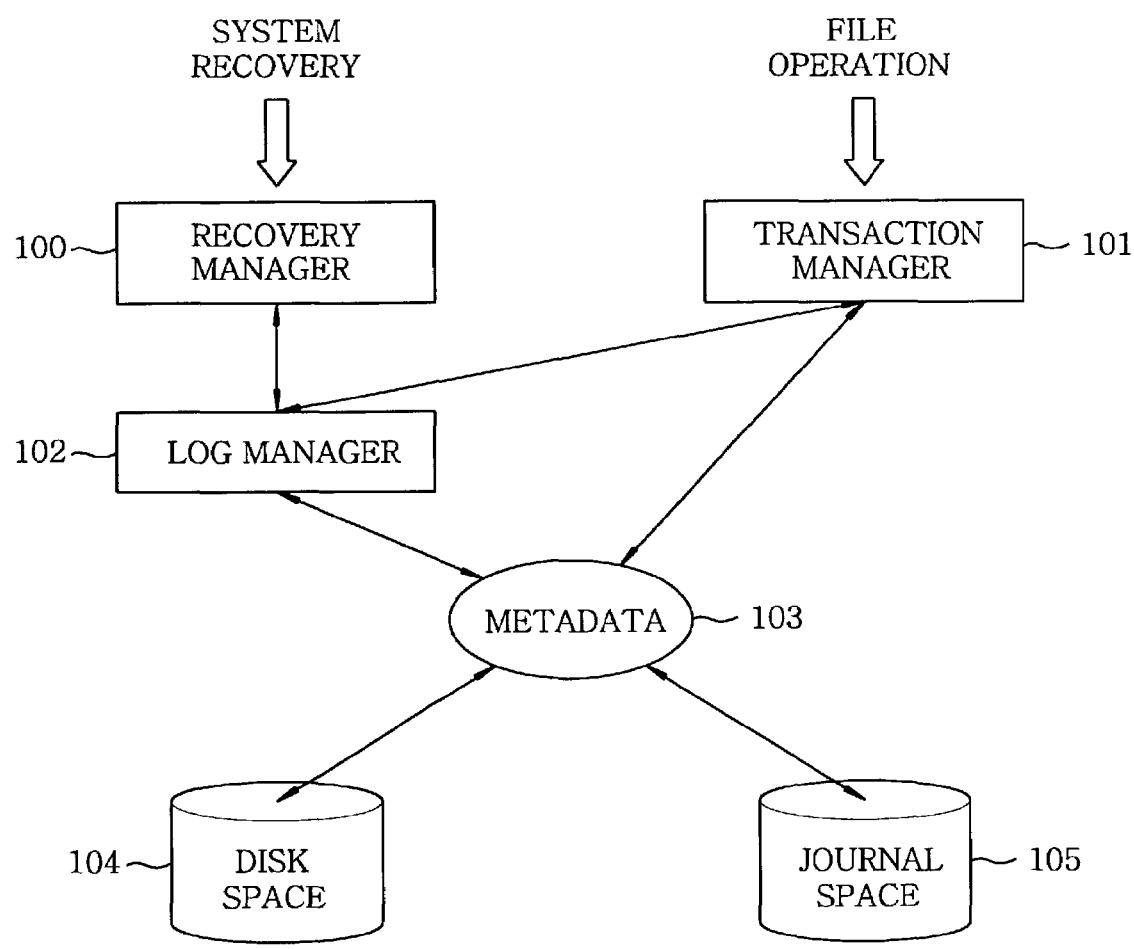
FIG. 1 describes a diagram of a recovery management module in a shared disk file system in accordance with the present invention.

FIG. 1 is a diagram of a recovery management module for undertaking to recover a file system in a shared disk file system under the SAN environment.

As illustrated, the recovery management module is constituted with a transaction manager 101 for performing each of operations, a log manager 102 for recording the modified metadata 103 of a disk space 104 in a journal space 105 and a recovery manager 100 for recovering an error when a system is abnormally terminated.

The transaction manager 101 uses a journaling method as a recovery technique on the shared disk file system such as the SAN environment. In order to support the journaling method, a transaction process is performed on a modification operation of the metadata 103 and a principal data. The transaction manager 101 guarantees atomicity for the data modification operation so that the metadata 103 can maintain its consistency.

Figure 2:
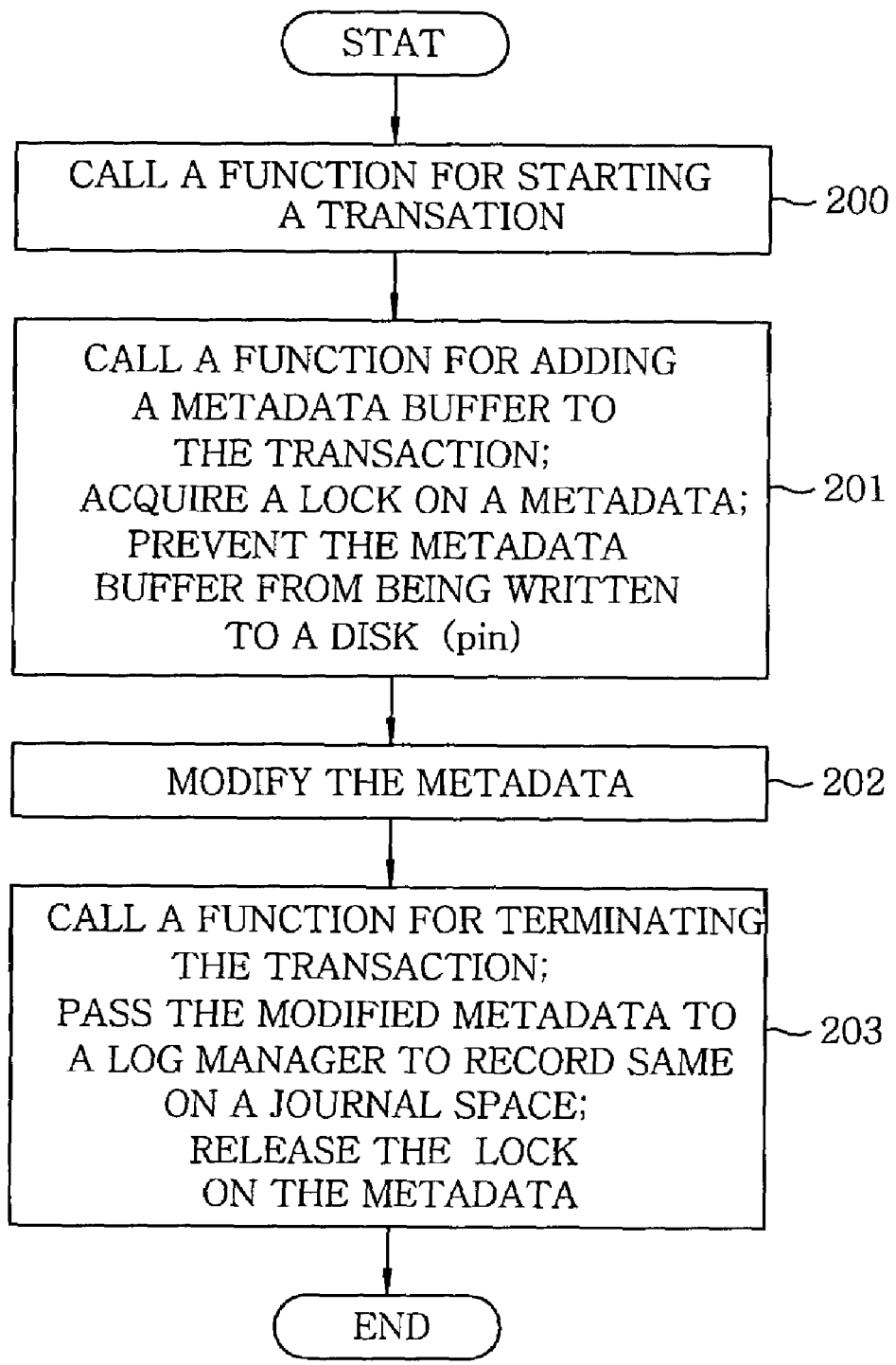
FIG. 2 illustrates a transaction process in the shared disk file system in accordance with the present invention.

FIG. 2 shows a transaction process performed by the transaction manager 101.

First, when a system call operation to take part in the journaling is generated, a transaction to guarantee a recovery is started so that a new transaction region is assigned and initialized and a transaction type is set up (step 200).

A lock on the metadata to be modified is acquired and lock information is added to the transaction so that the transaction takes its management on the lock information. In other words, the transaction manager maintains the lock information acquired during the transaction process and releases the lock information when the transaction is committed. Also, when a modification of a metadata buffer takes place, the transaction manager prevents a modified content on the metadata buffer from being reflected to a disk (step 201).

Thereafter, the metadata is modified (step 202).

After the modification of the metadata is completed, the modified metadata is sent to the log manager. And then, the lock information acquired during the transaction process is released to access to the metadata, so that another host is allowed to access to the modified metadata. After all these processes, the transaction is committed (step 203).

Meanwhile, if another host intends to access to the modified metadata in a conventional global file system (GFS), the metadata cannot be used until it is recorded on a disk. That is, after the metadata is recorded on the disk, another host can access to the corresponding metadata.

Therefore, disk input/output takes place twice after the modification of the metadata. That is to say, there is a disadvantage that both log and original metadata to be recorded in a journal space should be recorded on the disk.

The process described above is illustrated in FIG. 3.

First, a recovery management module 302 of a host A 300 retrieves metadata 313 from a disk space 311 and loads the metadata 313 into a buffer 304 (step 306).

After the metadata is modified, a log is recorded on a journal A 314 that is a journal space for the host A 300 in a journal space 312. In this case, if a host B 301 intends to access to the modified metadata modified by the host A 300, the host A 300 records the real metadata itself on the disk space 311 (step 307).

After the metadata itself is recorded on the disk space 311, the host B 301 accesses to the disk space 311 to retrieve the metadata 313 to a buffer 305 (step 308).

The host B 301 modifies the metadata. Then, if the transaction is committed, the modified metadata is recorded on a journal B 315 that is a journal space for the host B 301 in the journal space 312 (step 310).

The conventional journaling process described above has a disadvantage that a system performance is deteriorated because disk input/output takes place five times.

In order to make up the disadvantage, the present invention suggests a metadata management technique using a global buffer, wherein the global buffer integrates and manages local buffers existing in all the hosts.

Figure 4:
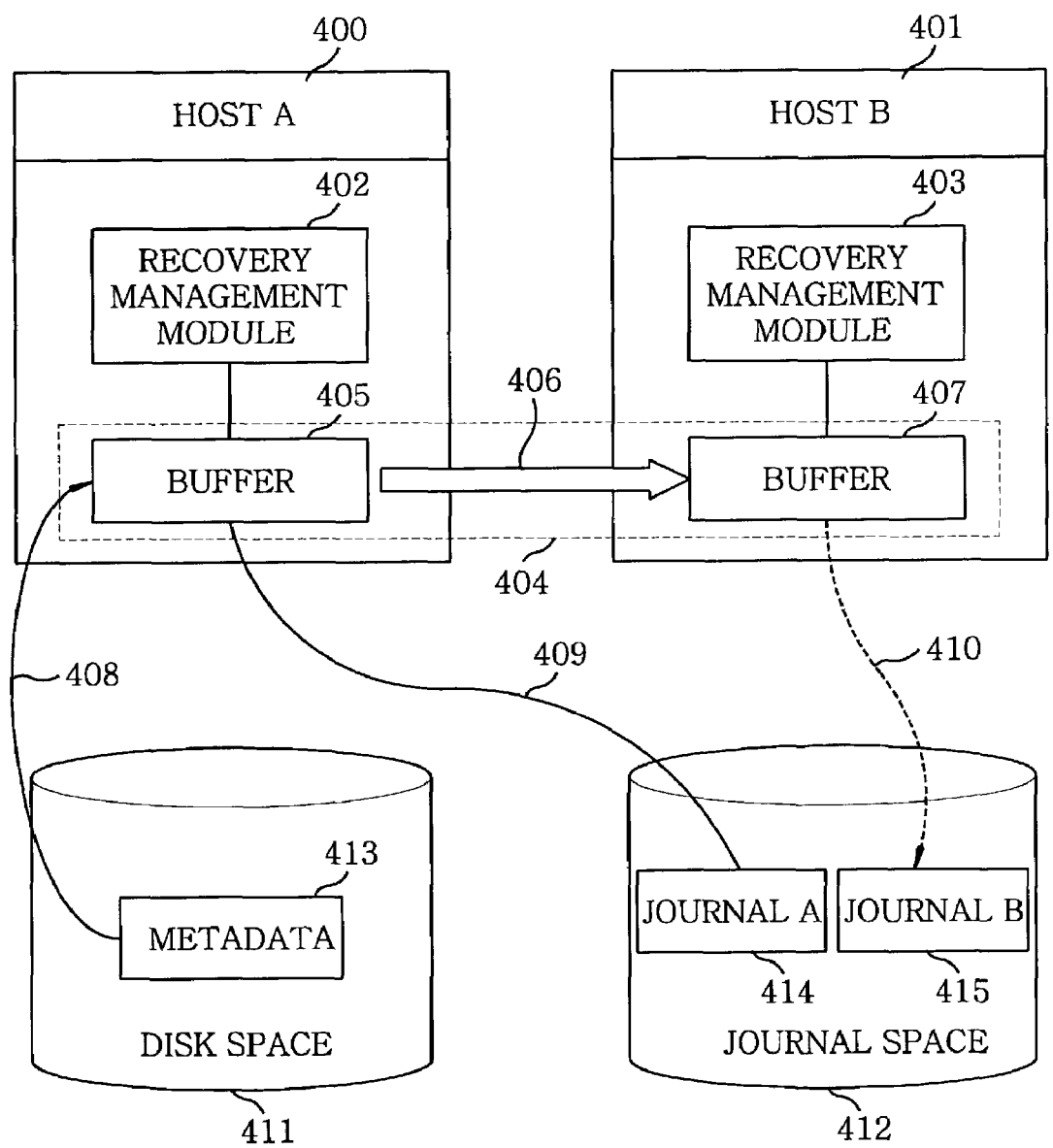
FIG. 4 presents a journaling method using a global buffer in the shared disk file system in accordance with the present invention.

FIG. 4 depicts a journaling process using the global buffer in the SAN environment employing the present invention.

First, a host A 400 retrieves metadata 413 from a disk space 411 and loads the metadata 413 into a buffer 405 (step 408).

Then, the metadata is modified and a log is recorded on a journal A that is a journal space for the host A 400 in a journal space 412 (step 409).

If a host B 401 intends to access to the modified metadata modified by the host A 400, the host B 401 requests a global buffer manager 404 to access to the modified metadata modified by the host A. Since, the global buffer manager 404 exists in a buffer 405 of the host A 400, the global buffer manager 404 acquires a lock on the corresponding metadata and transmits the modified information on the metadata to the host B 401 through a network (step 406).

Figure 3:
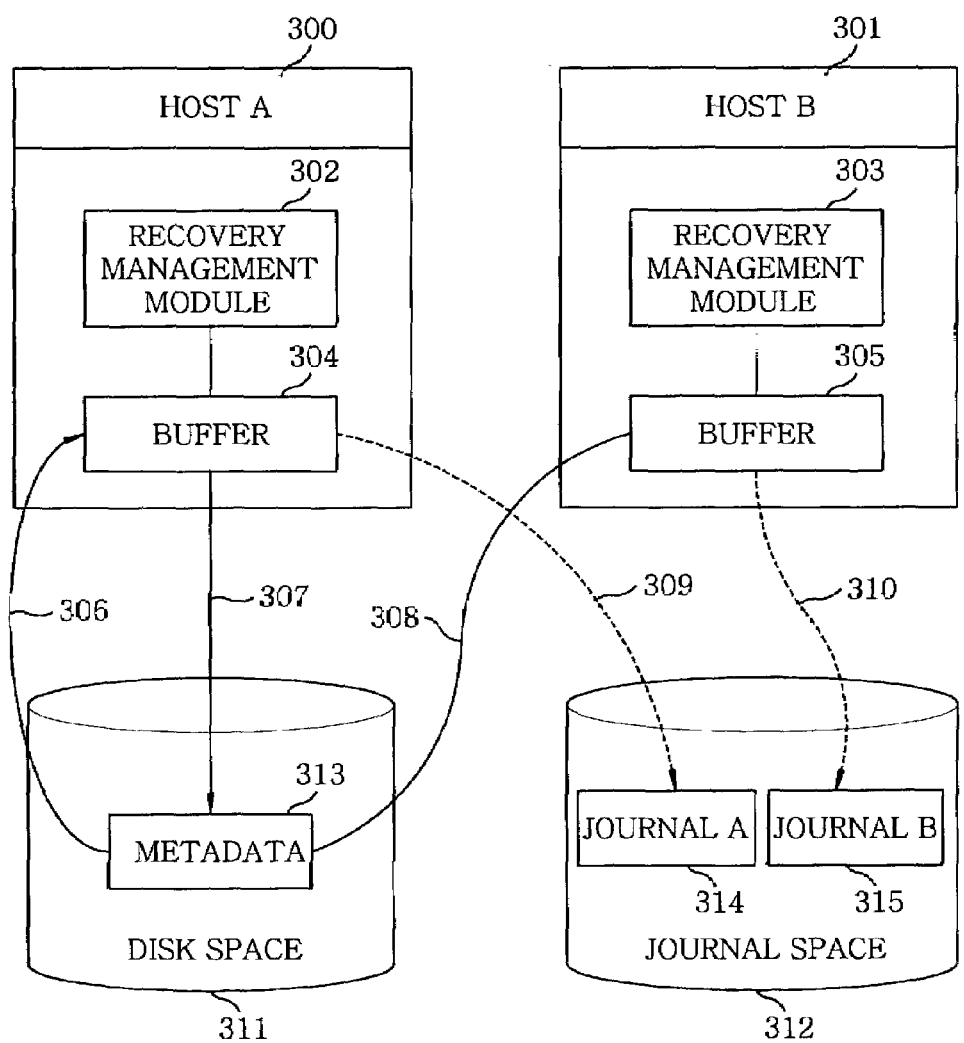
FIG. 3 depicts a journaling method when a same metadata is received in a conventional shared disk file system.

The disk access number in a journaling process of the present invention is three, which is smaller by two than that in the conventional GFS file system illustrated in FIG. 3. That is why transmission time through a network is faster than disk input/output time. Especially, since the communications in the SAN environment is performed through a fibre channel, a system performance can be more improved.

Referring to FIG. 1 again, the log manager 102 records information on the modified metadata 103 and the general principal data, which are transmitted from the transaction manager 101, on a journal space 105. Before the modified metadata 103 is recorded on the real disk space 104, the log information must be recorded on the journal space 105. In the result, a previous state may be regenerated by using the log information recorded in the journal space 105 when a system fails.

Since a plurality of servers shares one journal in a general shared file system, a management of the journal is complicated and ineffective. To overcome the weakness, each server has its own journal space in the present invention. Further, each journal space may be accessed by all the servers in order that a failed system may be recovered by another server. If the log information recorded on a journal space corresponding to the failed system is accessed and the log is regenerated, a previous state having no failure may be quickly recovered.

Meanwhile, the conventional GFS file system uses an asynchronous logging as a logging technique on metadata, wherein the asynchronous logging may not guarantee a recovery if a system failure occurs when the log is not reflected to a disk on a committed transaction. To solve the problem, the present invention uses a synchronous logging on the metadata.

Further, the conventional GFS file system may not guarantee a recovery on principal data since a recovery on the metadata is supported but a journaling on the principal data is not performed. To solve the problem, the present invention uses the journaling method on the principal data. In order to support the recovery on the principal data, a version number on the principal data should be maintained as maintained on the metadata.

In addition, the asynchronous logging technique is used as a logging technique on the principal data so that the disk access number can be reduced. The synchronous logging technique guarantees a recovery on a committed transaction, but has a problem that the disk access number increases since the log information must be reflected to the disk whenever a transaction is committed. Therefore, if the synchronous method is used on the principal data, a system performance may be remarkably deteriorated. To solve the problem, the asynchronous logging is performed on the principal data. Since the principal data is less important than the metadata from the point of the recovery, the asynchronous logging of the synchronous logging makes no difference to the principal data. Accordingly, if the asynchronous logging is performed on the principal data, the disk access number can be reduced so that the system performance may be improved. The recovery method described above can guarantee a recovery not only on the metadata but also on the general data.

Figure 5:
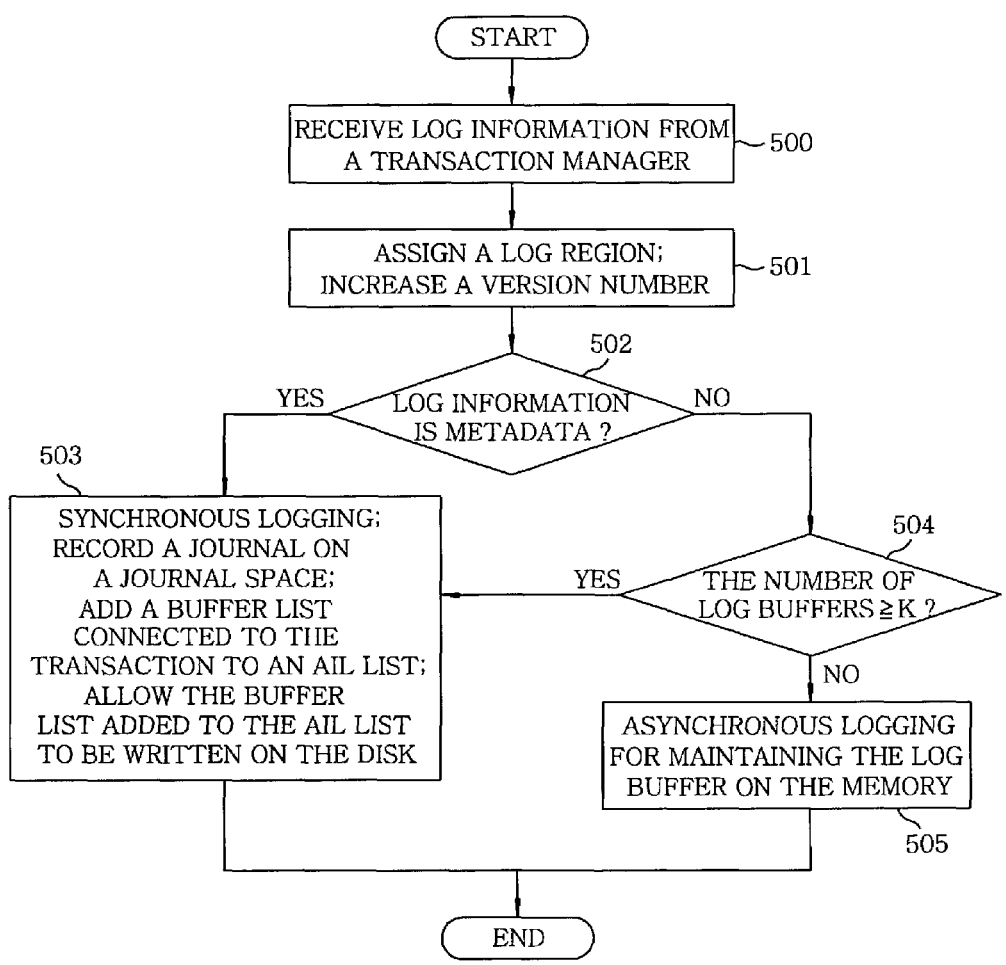
FIG. 5 represents a log management process in the shared disk file system in accordance with the present invention.

FIG. 5 illustrates a log management accomplishment process by a log manager in accordance with the present invention.

First, modified metadata information is received from a transaction manager (step 500).

A corresponding log region is assigned by receiving the metadata and calculating an amount of log. Then, a version number is increased by 1 on a log buffer connected to a transaction (step 501). The version number is used for determining whether the log should be replayed by comparing the log with a disk version when a system fails.

It is determined whether the modified log information is metadata. If it is the metadata, a synchronous logging is performed (steps 502 and 503). If it is not the metadata, it is determined whether the number of log buffers is over a predetermined number (K). If the number thereof is over the predetermined number, the synchronous logging is performed (steps 504 and 503). If it is smaller than the predetermined number, an asynchronous logging in which the log buffer is maintained in a memory is performed (steps 504 and 505).

In the synchronous logging process, a journal is recorded in a journal space. Besides, log buffer lists connected to a transaction are added to an active item list (AIL). Then, a disk reflection ban on the buffers connected to the transaction is unpinned so that a reflection of the metadata itself to a disk is admitted. As a result, log information is recorded on the journal space before the modified metadata itself is reflected to the disk and, therefore, a recovery is guaranteed on an operation in which the transaction is committed. Later, if the metadata is reflected to the disk, the log buffer lists are removed from the AIL. The AIL manages buffers that are not reflected to the real disk after the transaction is committed.

Figure 6:
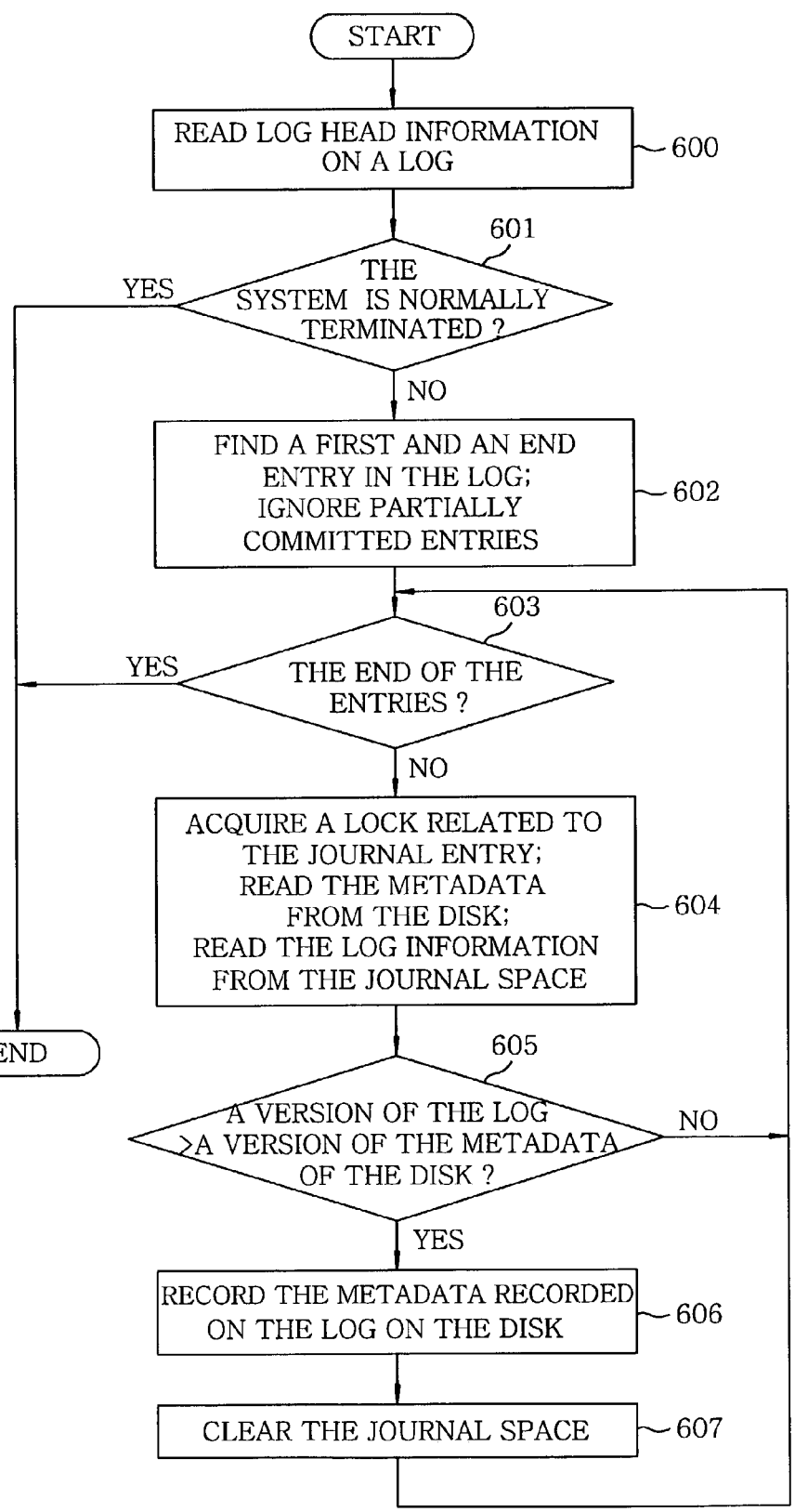
FIG. 6 shows a recovery management process in the shared disk file system in accordance with the present invention.

FIG. 6 presents a recovery management process in a shared disk file system in accordance with the present invention. When a system failure occurs in the shared file system, a recovery operation is performed in order to maintain consistency of metadata.

Referring to FIG. 1 again, the called recovery manager 100 recovers the contents of the metadata modified by the corresponding transaction into a previous state for the transaction by using the log information recorded in the journal space 105.

A failed host ID is used to call the recovery manager 100 in order to recover a break of the file system consistency due to an abnormal termination. FIG. 6 represents a recovery process by the call of the recovery manager 100.

First, a journal space corresponding to the failed host is searched to read head information of the log. Then, it is determined whether the system is normally terminated by checking the log information (steps 600 and 601).

If it is determined the system is normally terminated, a recovery matrix is terminated. If the system is abnormally terminated, a first and an end entry of the log are searched (step 602).

While the log is read from the first entry to the end entry, partially committed entries are ignored among the committed entries and it is determined whether the entry of a journal is the end entry (steps 602 and 603).

A modification of another host during a recovery is prevented by acquiring a lock related to each of journal entries to be recovered. The metadata is read from the disk and log information is read from a journal space (step 604).

Later, it is determined whether the metadata version of the disk is smaller than the log version by comparing the version of the log information read from the journal space with the version recorded in the disk (step 605).

If a generation version recorded in the log is larger than a generation version reflected to the disk space, the log information is reflected to the disk. That is, the recovery process may be quickly completed by replaying the log information (step 606).

Then, the journal space is cleared and the recovery is terminated (step 607).

Meanwhile, if the failed host does not need the acquired lock information during the recovery, other hosts can continue a normal operation.

Hereinafter, in order to help a better understanding of the present invention, how to maintain consistency of the file system will be described by representing metadata modification process in the shared disk environment of the present invention and a recovery process when a system error occurs during the modification process.

In an exemplary environment described below, two hosts are connected through a network and a disk may be divided into a part for the metadata and a journal region for recording the journal, wherein each host has its own journal space for recording its log. When the system fails, the journal space is shown to other hosts.

Referring to FIG. 4 again, the host A 400 accesses to a metadata buffer existing in a memory in order to access to metadata. If the metadata buffer to be searched does not exist in the memory, the host A 400 directly accesses to a disk space 411. Then, information on the metadata 413 is retrieved and loaded into a buffer 405 (step 408). Here, a version recorded in the disk is assumed to be 0.

In order to modify the metadata buffer 405, a transaction is processed. If the transaction is terminated, the version increases from 0 to 1 and the log information on the metadata is reflected to the disk (step 409).

When the host B 401 accesses to the metadata buffer 405 used by the host A 400, the host A 400 releases a lock and hands over its authority to the host B 401 if the transaction is terminated.

The host B 401 processes a transaction in order to modify metadata information transmitted from the host A 400 (step 406) and increases a version by one. In this example, the log information modified in the host B 401 is reflected to a journal B 415 that is a journal space of the host B 401. The metadata buffers 405 and 407 of the hosts A 400 and B 401 are generated when the host A 400 fails before the buffers are reflected to the real disk space 411 by a buffer policy.

A recovery on the host A 400 is called with a failed host ID. A disk version is compared with a log version by retrieving log information from a journal A that is a journal space of the host A 400 and by retrieving metadata 413 from the real disk space 411. Here, the log version is 1 and the disk version is 0 so that the log may be replayed. Therefore, the disk version is modified into 1 and the recovery is completed.

While the invention has been shown and described with respect to the preferred embodiments, it will be understood by those skilled in the art that various changes and modifications may be made without departing from the spirit and scope of the invention as defined in the following claims.

What is claimed is:

1. A journaling method for supporting a recovery when a system in a shared disk environment is abnormally terminated, comprising the steps of:

(a) starting, if a system call operation to process a journaling is generated, a transaction to guarantee a recovery so that a new transaction region is assigned and initialized and a transaction type is set up;

(b) acquiring lock information on modified data and adding the lock information to the transaction so that a transaction is allowed to manage the lock information and to prevent the log information from being written to a disk during modifying metadata;

(c) recording the modified metadata added to the transaction and modified information modified on principal general data on a journal space and releasing the lock information connected to the transaction;
(d) gathering a log buffer from a modified metadata buffer and a principal data buffer;
(e) assigning a log region and increasing a version;
(f) determining whether log information is metadata or general data; and
(g) recording the metadata and the general data in a journal space according to the determining result, wherein the step (g) includes the steps of:
(g1) performing a synchronous logging if the log information is the metadata or if the log information is the principal data and the number of the log buffers is equal to or larger than a predetermined number; and
(g2) performing an asynchronous logging if the log information is the general principal data and the number of the log buffers is smaller than the predetermined number, wherein the step (g1) includes the steps of:
(g11) recording a log in a journal space;
(g12) adding a buffer list connected to the transaction to an AIL list; and
(g13) releasing a disk reflection ban on a buffer added to the AIL list.

2. The method of claim 1, wherein the step (g2) maintains the log information in a memory space, not reflecting to the journal space.

3. A recovery method of a shared disk file system for maintaining consistency of the shared disk file system by using a journaling method in a shared disk environment when a system is abnormally terminated, comprising the steps of:
(a) reading log head information;
(b) determining whether the system is normally terminated and detecting a committed entry from log information if the system is abnormally terminated;
(c) determining whether the committed entry is the end of a journal;
(d) reading disk information and journal space information in a disk and a journal space if the entry is not the end of the journal, respectively;
(e) comparing the disk information and version numbers of the journal space information; and
(f) recording log information recorded in log on the disk if the version number of log information in the disk is smaller than that in the journal.

4. The method of claim 3, the steps (d), (e) and (f) are repeatedly performed until the entry becomes the end of the journal.

* * * * *